United States Patent [19]

Pautler et al.

[11] 4,312,074

[45] Jan. 19, 1982

[54] METHOD AND APPARATUS FOR DETECTING A DATA SIGNAL INCLUDING REPEATED DATA WORDS

[75] Inventors: James A. Pautler, St. Louis, Mo.; Kenneth A. Felix, Crystal Lake, Ill.

[73] Assignee: Motorola, Inc., Schaumburg, Ill.

[21] Appl. No.: 119,605

[22] Filed: Feb. 7, 1980

[51] Int. Cl.³ .............................................. H03D 1/00
[52] U.S. Cl. .................................... 375/96; 375/114; 370/108; 371/69; 364/728
[58] Field of Search ............... 370/106, 108; 375/94, 375/95, 96, 106, 111, 114, 118, 119; 371/42, 46, 69; 343/5 DP; 364/486, 514, 574, 575, 728; 365/233; 360/5, 7

[56] References Cited

U.S. PATENT DOCUMENTS

| | | | |
|---|---|---|---|
| 3,663,762 | 5/1972 | Joel, Jr. ............................ | 179/2 E |
| 3,766,316 | 10/1973 | Hoffman et al. ................. | 375/116 |
| 3,819,872 | 6/1974 | Hamrick et al. ................. | 179/2 E |
| 3,906,166 | 9/1975 | Cooper et al. ................... | 179/2 E |
| 3,938,083 | 2/1976 | Schowe, Jr. ..................... | 371/38 |
| 3,990,049 | 11/1976 | Wirth ............................... | 364/200 |
| 4,021,609 | 5/1977 | Oyama et al. ................... | 375/118 |
| 4,029,900 | 6/1977 | Addeo ............................. | 375/120 |
| 4,059,825 | 11/1977 | Greene ............................ | 371/42 |
| 4,154,984 | 5/1979 | Murasov ......................... | 370/108 |

OTHER PUBLICATIONS

IBM Technical Disclosure Bulletin, vol. 20, No. 11B, Apr. 1978, pp. 5051-5054.

*Primary Examiner*—Benedict V. Safourek
*Attorney, Agent, or Firm*—Rolland R. Hackbart; James W. Gillman

[57] ABSTRACT

A method and detector are described for detecting a data signal including at least three repeated data words each preceded by a Barker word. The detector includes a microcomputer that is responsive to interrupt and correlation programs for receiving and timewise correlating the repeated data words in the data signal. Upon detection of each Barker word, the microcomputer stores the following data word and measures the elapsed time interval between data words by measuring the time between detection of Barker words. The elapsed time interval between the previously and presently received data words is added to the stored time interval of all previously received data words. If at least three of the received data words have corresponding stored time intervals that are correlated with predetermined time interval ranges, a correlation indication signal is provided to indicate that valid data words have been received. The inventive method and detector may be advantageously utilized in mobile and portable stations of a radio communication system for receiving high speed data on a noisy voice channel.

18 Claims, 6 Drawing Figures

METHOD AND APPARATUS FOR DETECTING A DATA SIGNAL INCLUDING REPEATED DATA WORDS

BACKGROUND OF THE INVENTION

The present invention relates generally to data signal detectors, and more particularly to an improved method and apparatus for the detection of a data signal including repreated data words transmitted on a noisy communication channel, such as the radio channels found in some mobile and portable radiotelephone communication systems.

Prior communication systems have typically assigned separate communication channels to accommodate data signals and voice signals. However, in newer high-capacity mobile and portable radiotelephone communication systems (HCMTS), it is necessary to transmit data signals on voice communication channels in order to relay critical supervisory control information. For example, it is sometimes necessary to direct a mobile station of such an HCMTS system to switch from one voice channel to another. One such occasion necessitating voice channel switching results when a mobile or portable station moves from one cellular coverage area to another. Radiotelephone communication systems having these characteristics are described in a number of publications and patents, including, for example, U.S. Pat. Nos. 3,663,762, 3,819,872, 4,029,900 and 3,906,166. In these HCMTS systems, data is communicated over voice channels to an individual mobile or portable unit by briefly blanking the voice signals and sending a data signal during the blanking interval. Since the data signal is transmitted at a relatively high speed, for example, 10 KBPS, the subscriber hears only a momentary clock in the voice signal.

However, substantial difficulty is encountered in the mobile and portable stations in such HCMTS systems in recovering data signals transmitted on noisy voice channels. Therefore, it is desirable to utilize various techniques for enhancing reception of the data signal by the mobile and portable stations. For example, the information may be repeated a number of times within the data signal. Furthermore, each repeated information word may be preceded by a one-zero dotting pattern and a synchronization word, such as, a so-called Barker sequence, for increasing the probability of detection of the data signal by the mobile and portable stations. One such signalling scheme utilizing repeated information is described in the aforementioned U.S. Pat. No. 4,029,900. One format for the data signal described in this patent is illustrated herein in FIG. 2. The data signal of FIG. 2 includes eleven repeats of a data word, each preceded by a Barker word and a bit synchronization word.

According to a prior detection technique, the presence of the data signal may be determined by a tone detector that is tuned to the frequency of the dotting pattern in the bit synchronization signal. For example, if the bit frequency of the data signal is 10 KHz, the tone detector may be tuned to 5 KHz for detecting the one-zero dotting pattern of the bit synchronization signal. After detection of the bit synchronization signal, the following data words may be located by searching for the preceding Barker word. However, such a scheme is subject to falsing caused by interferring signals on the communication channel if the initial or following Barker words are not detected in sequence. For example, the Barker sequence may occur in the voice signal itself or may occur in the data words of the data signal. If the initial Barker word is missed, and a Barker sequence imbedded in a data word is detected, the entire data signal may not be detected, and as a result, may be totally ignored. Thus, the foregoing prior art detection technique may result in the loss of important supervisory control information when utilized to detect a data signal on a noisey voice channel of radio communication systems.

SUMMARY OF THE INVENTION

Accordingly, it is a general object of the present invention to provide an improved method and apparatus for detecting a data signal including repeated data words.

It is another object of the present invention to provide an improved method and apparatus for detecting a data signal including repeated data words, that utilizes time correlation techniques for providing reliable detection of the repeated data words.

In practicing the present invention, an improved method and apparatus is provided for receiving a data signal, including at least three data words each preceded by a synchronization word. The data signal is transmitted on a communication channel to a remote station, such as a mobile or portable station of a radio communication system. Each remote station includes circuitry for receiving the data signal, for detecting the synchronization word before each data word thereof, and for providing a synchronization indication signal upon detection of each snchronization word. The data signal receiving apparatus of the present invention further includes circuitry for storing a received data word in response to the synchronization indication signal; circuitry for measuring the time interval between a previously received data word and the presently received data word and storing the measured time interval for the presently received data word; circuitry for adding the measured time interval to the stored time interval for each previously received data word; circuitry for rejecting stored data words whose stored time interval is greater than a predetermined maximum time interval; and circuitry for correlating the stored time intervals corresponding to each stored data word with predetermined time interval ranges and providing a correlation indication signal if the stored time intervals for at least three stored data words occur within the predetermined time interval ranges. The data signal receiving apparatus of the present invention may include further circuitry for performing a bit-by-bit majority vote between the correlated data words to provide an output data word, which may then be decoded and acted upon accordingly. The data signal receiving apparatus of the present invention may be advantageously utilized in mobile and portable stations of a mobile radio communication channel, where the data signal includes as many as eleven repeated data words. Thus, if at least three of the repeated data words have corresponding stored time intervals occurring within predetermined time interval ranges, the data signal receiving apparatus of the present invention provides a correlation indication signal regardless of the order in which the three correlated data words are received.

DETAILED DESCRIPTION OF THE PREFERRED EMBODIMENT

Figure 1:
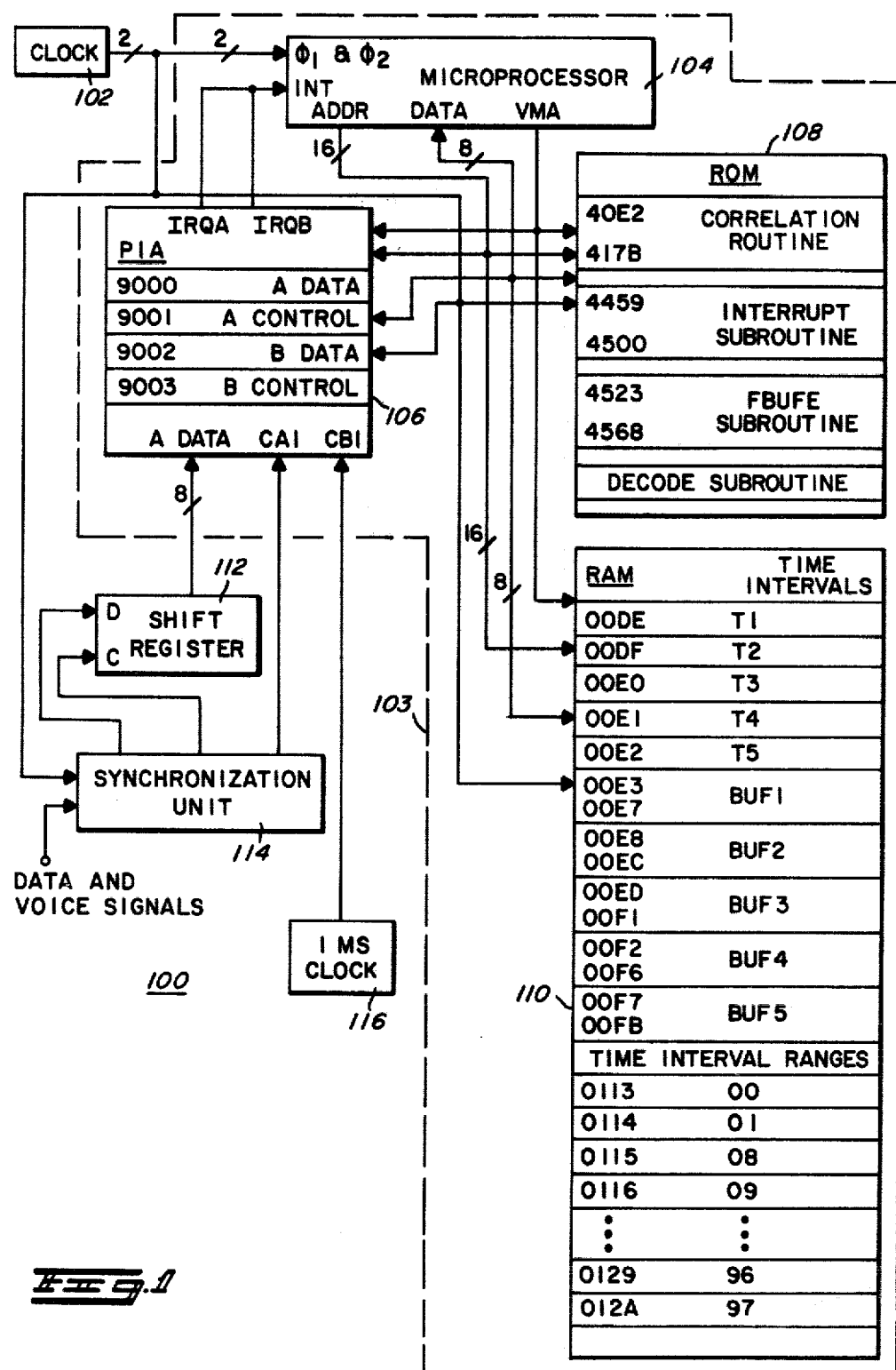
FIG. 1 is a block diagram of a data signal receiver embodying the present invention.

In FIG. 1, there is illustrated a data signal receiver embodying the present invention. The data signal receiver includes a microcomputer 103 comprised of a microprocessor (MPU) 104, a read-only memory (ROM) 108 for storing a control program, a random-access memory (RAM) 110 for storing constants and variables, a peripheral interface adapter (PIA) 106 for interfacing MPU 104 to external data and interrupt signals, and clock oscillator 102 for providing a clock signal for MPU 104. The microcomputer 103 may be any of a number of conventional microcomputers, such as the Motorola type M6800 microcomputer. In the preferred embodiment, microcomputer 103 is a Motorola type M6800 microcomputer, where MPU 104 is a Motorola type MC6800, ROM 108 is a Motorola type MCM6830, RAM 110 is a Motorola type MCM6810, PIA 106 is a Motorola type MC6821 and clock oscillator is a Motorola type MC6875 together with a crystal oscillator.

The data signal receiver 100 further includes synchronization unit 114 and shift register 112 for receiving the data signals transmitted on a voice communication channel. The synchronization unit 114 activates the CA1 input of PIA 106 for interrupting the microcomputer 103 whenever eight bits (hereinafter referred to as a "byte") of received data are present in shift register 112. The data signal receiver 100 also includes a one millisecond clock oscillator 116 for providing a one millisecond clock signal that is coupled to the CB1 input of PIA 106 for interrupting the microcomputer 103 at one millisecond intervals. The interrupts at one millisecond intervals are utilized by the microcomputer 103 for timing the periods between reception of successive data words.

Figure 2:
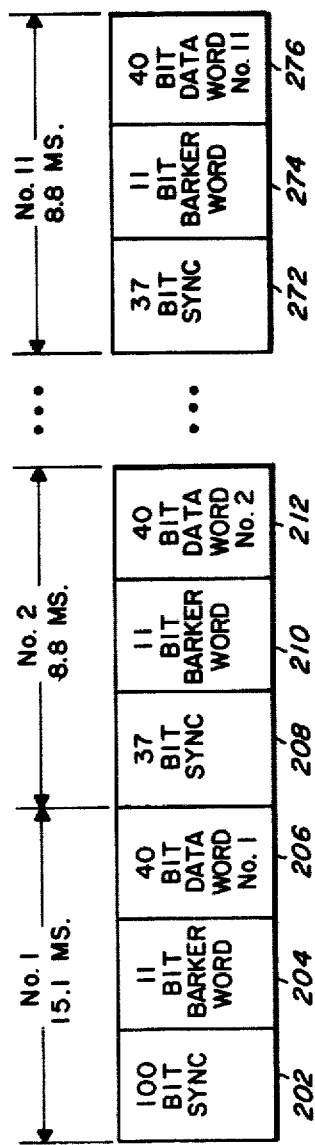
FIG. 2 illustrates a prior art format of a data signal which may be advantageously utilized in practicing the present invention.

The data signal receiver 100 of the present invention is particularly well adapted to receive data signals including at least three repeated data words, such as that illustrated in FIG. 2. Referring to FIG. 2, each data word 206, 212 and 276 is preceded by a Barker word 204, 210 and 274 and a bit synchronization signal 202, 208 and 272 having a one-zero dotting pattern. The logical state of the bits of the data signal are preferably coded according to a type of phase-shift keying commonly referred to as the "Manchester" coding format by those skilled in the art. In the preferred embodiment, the data words are repeated eleven times in the data signal which is trasmitted at a 10 KHz bit rate on a voice channel to a remote station, such as a mobile or portable station of a radio communication system. Further details of the format for such a data signal are provided in the aforementioned U.S. Pat. No. 4,029,900.

According to the general operation of the data signal receiver 100, the microcomputer 103 in FIG. 1 is interrupted via the CA1 input of PIA 106 by the synchronization unit 114 when a byte of a data word has been shifted into shift register 112. The microcomputer 103, under control of the interrupt subroutine stored in ROM 108, stores each byte of a data word received by the PIA 106 into the data word buffers, BUF1-BUF5, in RAM 110. In addition, the microcomputer 103 also measures the elapsed time interval between successive data words, by means of one millisecond interrupts provided by one millisecond clock oscillator 116, and stores cumulative elapsed time intervals in time interval buffers, T1-T5 in RAM 110 for each data word buffer, BUF1-BUF5. Data words are continually stored in the data buffers in RAM 110 until five data words have been received and stored. Once five data words have been received and stored, control of the microcomputer 103 is then transferred to the correlation routine stored in ROM 108 for correlating the cumulative elaspsed time intervals of each received data word with the time interval ranges stored in RAM 110. In accordance with the present invention, if at least three of the data words stored in the data word buffers in RAM 110 have cumulative elaspsed time intervals occurring within the time interval ranges in RAM 110, control of the microcomputer may then be transferred to a decode subroutine in ROM 108 for further processing of the stored data words. Even though in the preferred embodiment of the present invention at least five data words are stored and five data words are correlated before entering the decode subroutine, as few as three data words or as many as eleven data words may be desired to be received and correlated before entering the decode subroutine. Furthermore, if the number of repeats of the data words in the data signal is increased to be greater than eleven, the number of correlated data words necessary for entering the decode subroutine may likewise be adapted to accommodate the particular signalling format and desired system performance.

The synchronization unit 114 of the data signal receiver 100 is coupled to the particular communication channel carrying the data and voice signals. The synchronization unit 114 may be bit synchronized to the data signal by the one-zero dotting pattern of the bit synchronization signal 202 which precedes each data word of the data signal, as shown in FIG. 2. The synchronization unit 114 recognizes the particular pattern of the selected Barker word 204 in FIG. 2 that precedes each data word in order to identify the beginning of the following data word. Upon detection of the Barker word 204, 210 and 274, the synchronization unit 114 then serially clocks the following forty bit data word into shift register 112. When each byte of a data word has been shifted into shift register 112, the synchronization unit 114 then provides an interrupt signal to the CA1 input of PIA 106 for interrupting microcomputer 103. Thus, the synchronization unit 114 provides five interrupts for the five bytes of each forty bit data word. The functions of the synchronization unit 114 are well known in the art, and exemplary embodiments of such a synchronization unit are provided in the instant assignee's co-pending application, Ser. No. 119,350, entitled "Phase Encoded Data Detector", invented by Michael McClaughry and John P. Byrns and filed the same date as the instant application, in the aforementioned U.S. Pat. No. 4,029,900, and in U.S. Pat. 3,766,316.

The data word bytes from shift register 112 and the interrupt signal from synchronization unit 114 are coupled to the A-side inputs of PIA 106. Thus, each byte of a data word from shift register 112 is stored in the A-data register of PIA 106, which has been assigned address 9000 (all addresses herein are expressed in hexidecimal), and the interrupt signal from synchronization unit 114 is stored in the A-control register of PIA 106, which has been assigned address 9001. Similarly, the interrupt clock signal from one millisecond clock oscillator 116 is stored in the B-control register of PIA 106, which has been assigned address 9003. Both the interrupt signals coupled to the CA1 and CB1 inputs of PIA 106 are buffered therein and directly coupled to outputs IRQA and IRQB, which may be wire-ORed and coupled to the interrupt input of MPU 104. Since the interrupt signals from synchronization unit 114 and one millisecond clock oscillator 116 are directly coupled to the interrupt input of MPU 104, control of the MPU 104 is transferred essentially immediately to the interrupt subroutine stored in ROM 108 in response to these interrupt signals. Such direct interrupt operation of the microcomputer 103 is necessary since the data signal bit rate, which is 10 KHZ in the preferred embodiment of the present invention, is relatively high, when compared to conventional supervisory signalling bit rates, requiring that the processing of interrupt signal be as fast as reasonably possible.

Figure 3:
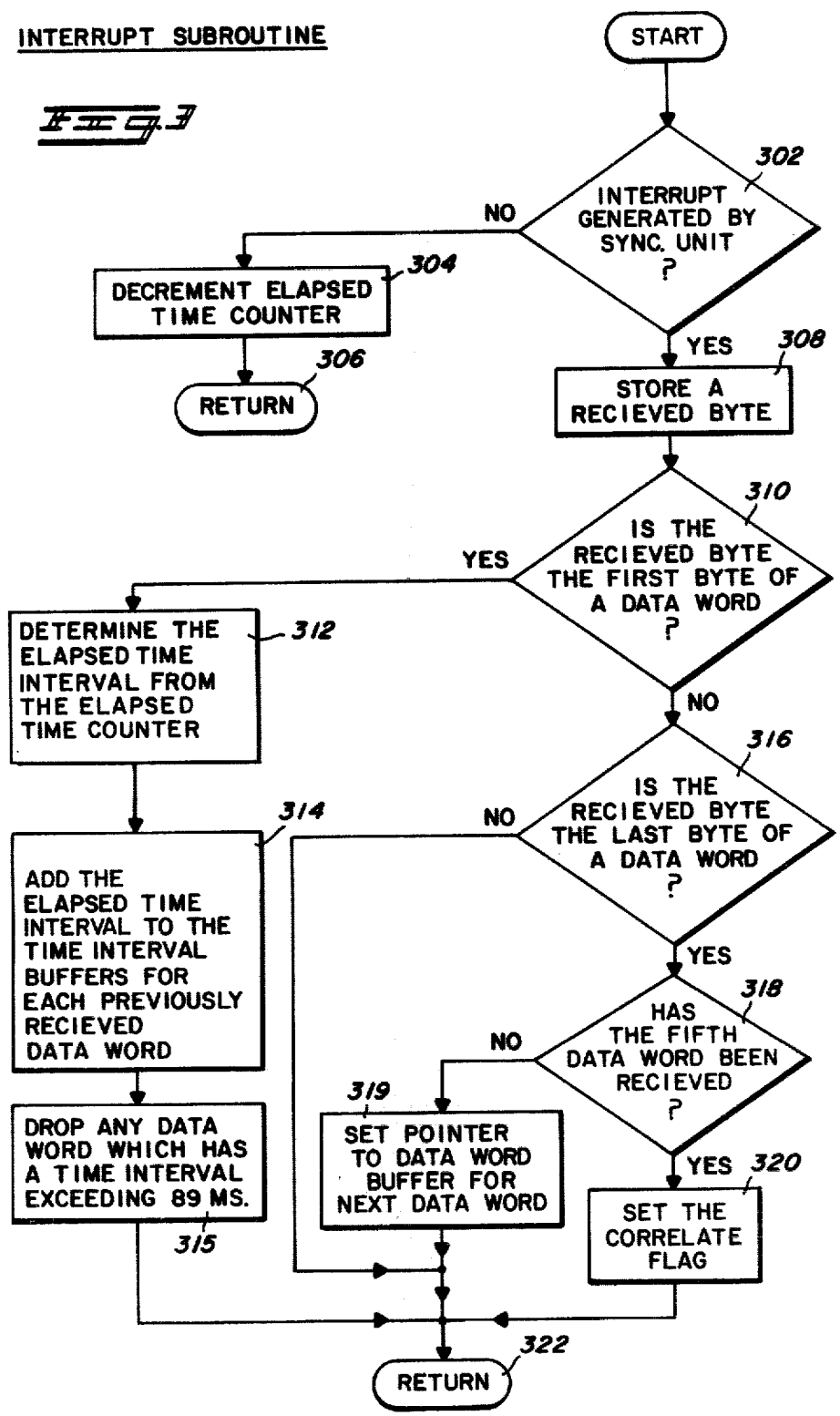
FIG. 3 is a flow chart of an interrupt subroutine that may be stored in the read-only memory in FIG. 1.

Referring to FIG. 3, there is illustrated a flow chart for the interrupt subroutine which is stored in locations 40E2-417B in ROM 108 in FIG. 1. A detailed program listing of the particular instructions stored in ROM 108 for the interrupt subroutine is provided in Table I, and a corresponding description of the program listing is provided in Table II, hereinbelow. The program listing of Table I provides both mnemonic instructions and machine language equivalent instructions suitable for execution by a Motorola type MC6800 microprocessor.

Referring to FIG. 3, the microcomputer 103 may be interrupted in response to the synchronization unit 114 or the one millisecond clock oscillator 116 in FIG. 1. If interrupted by the one millisecond clock oscillator 116, program control transfers from decision block 302 to block 304 where an elapsed time counter, labelled TIM1 in the program listing, is decremented by one. The program time counter is initialized to 89, corresponding to 89 milliseconds, and is decremented by one for each interrupt generated by the one millisecond clock oscillator 116. After executing block 304, program control returns from the interrupt subroutine at block 306.

If the microcomputer 103 has been interrupted by the synchronization unit 114, program control is transferred from decision block 302 to block 308 where a received byte of a data word is transferred from the A-data register of PIA 106 to the appropriate data word buffer in RAM 110. Next, at decision block 310, a check is made to see if the receive byte is the first byte of a data word. If the received byte is the first byte of a data word, program control is transferred from decision block 310 to block 312 where the time indicated by the elapsed time counter is subtracted from 89 milliseconds to obtain the elapsed time interval. Next, at block 314, the elapsed time interval determined in block 312 is added to the stored elapsed time interval for each previously received data word. Then, at block 315, any data word which has a cumulative elapsed time interval exceeding the maximum allowable time of 89 milliseconds is dropped from the data word buffer as being too old. The transmission time for each 88 bit repeat of a data word is 8.8 milliseconds. Thus, the elapsed time between the first data word and the eleventh data word of a data signal is 88 milliseconds. Because the elapsed time interval of the most recently received data word is always added to the stored elapsed time interval for the previously received data words, the oldest received data word has the largest cumulative elapsed time interval. When the cumulative elapsed time interval for any received data word exceeds 89 milliseconds, which would be the maximum cumulative elapsed time interval for the first of eleven consecutively received data words, it is dropped from the data word buffer since any data word having a cumulative elapsed time interval greater than 89 milliseconds is not from the current data signal. After checking for data words which have a cumulative elapsed time interval exceeding 89 milliseconds, program control returns from the interrupt subroutine at block 322.

Referring back to decision block 310, if the presently received byte is the second, third, fourth or fifth byte of a data word, program control transfers to decision block 316 where it is determined if the received byte is the last byte of a data word. If the received byte is not the last byte of a data word, program control returns from the interrupt subroutine at block 322. Otherwise, program control transfers from block 316 to block 318, where it is determined whether five data words have been received. If five data words have not been received, program control transfers from block 318 to block 319, where an empty data buffer is located, and a pointer, labelled CPNTB, is set to identify the empty data buffer for storing the next received data word, after which program control returns from the interrupt subroutine at block 322. Otherwise, program control proceeds from decision block 318 to block 320 where the correlate flag, labelled TCORR, is set to a logical high state so that program control will proceed to the correlation routine for correlating the five received data words. Proceeding from block 320, program control returns from the interrupt subroutine at block 322.

In summary, the interrupt subroutine of FIG. 3 is utilized to receive data words on byte-by-byte basis and to determine the cumulative elapsed time intervals for all received data words. Successive data words and their corresponding cumulative elapsed time intervals are store until five data words have been received and stored. Then, when five data words and their corresponding cumulative elapsed time intervals have been received and stored, the correlate flag, labelled TCORR, is set for correlating the cumulative elapsed time intervals of the five received data words with the time interval ranges stored in RAM 110 in FIG. 1.

Figure 4:
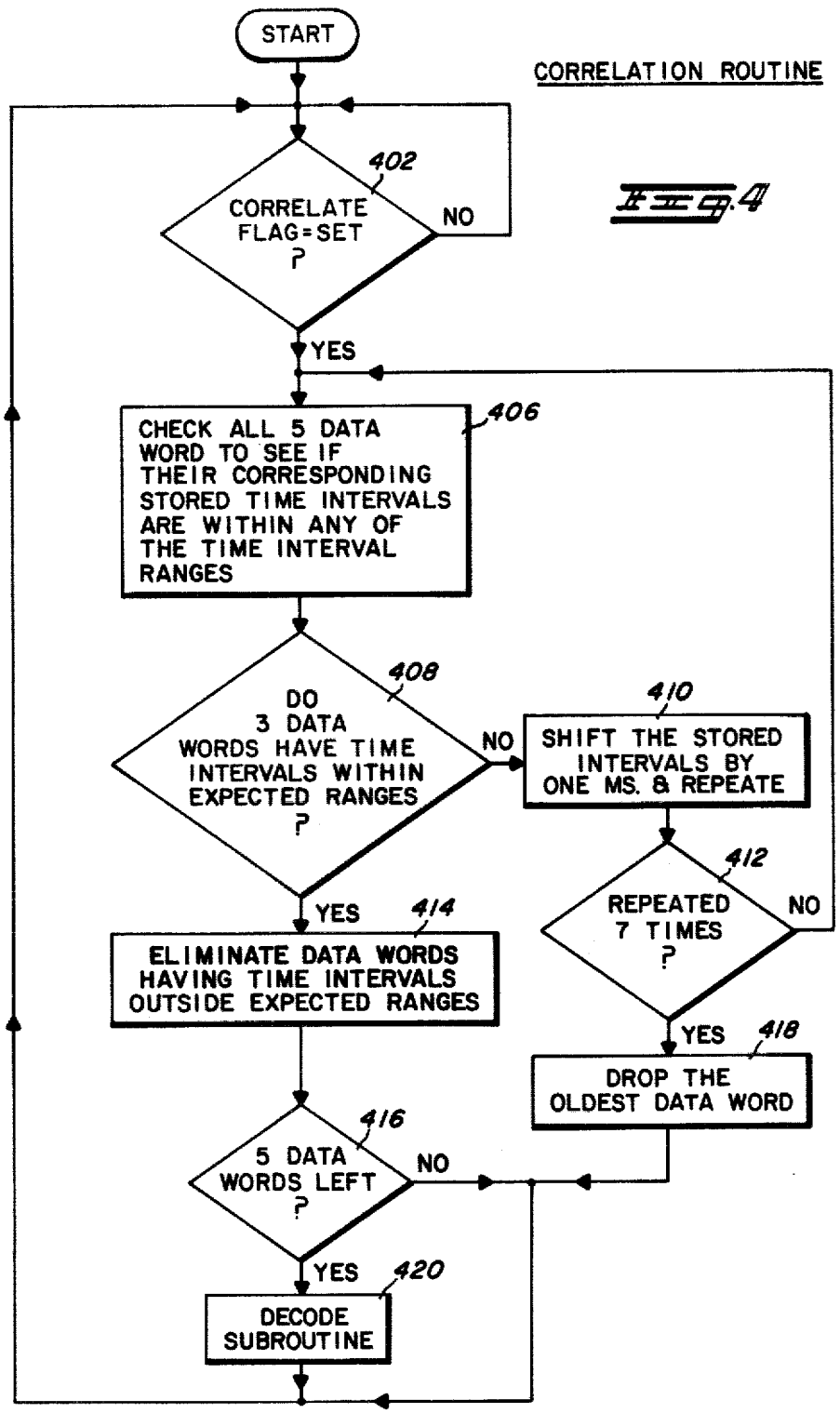
FIG. 4 is a flow chart of a correlation routine that may be stored in the read-only memory in FIG. 1.

Referring to FIG. 4, there is illustrated, the correlation routine stored in the address locations 40E2-417B in ROM 108 in FIG. 1. The program instructions for the correlation routine utilized in the preferred embodiment of the present invention are included in the program listing in Table I, and a corresponding description of the program listing is included in Table II, hereinbelow. In accordance with the present invention, the correlation routine is utilized to correlate the cumulative elapsed time intervals of each data word with the predetermined time interval ranges stored in RAM 110 in FIG. 1. The correlation is performed when five data words have been received, although any suitable number of data words greater than three may be utilized in practicing the present invention. Once the stored time intervals of five data words have been correlated, program control may proceed to the decode subroutine of FIG. 5 for decoding the timewise correlated data words.

Referring to decision block 402 of FIG. 4, correlation of the stored time intervals of five data words will not proceed until the correlate flag, labelled TCORR, is set. If the correlate flag is set, program control proceeds from decision block 402 to block 406 where the stored time intervals of five data words are checked to see if any of them correlate with the time interval ranges of 0–1, 8–9, 17–18, 26–27, 35–36, 44–45, 52–53, 61–62, 70–71, 79–80, 88–89 and 96–97 milliseconds stored in RAM 110 in FIG. 1. Next, at decision block 408, if at least three of the stored time intervals do not correlate with the time interval ranges in RAM 110, program control proceeds to block 410 where each of the stored time intervals for the five data words is shifted by adding one millisecond to it. Then, program control proceeds by way of decision block 412 back to block 406 to repeat the correlation with the shifted stored time intervals. The stored time intervals are shifted seven times to accommodate any possible skew with respect to the time interval ranges in RAM 110. For example, stored time intervals of 58, 68 and 76 correlate with time interval ranges of 61–62, 70–71 and 79–80 at a skew of 3 milliseconds. If the correlation has been repeated seven times, all possible shifted stored time intervals for the five data words have been checked with all of the time interval ranges in RAM 110 without finding at least three correlated stored time intervals, and program control proceeds from decision block 412 to block 418 where the oldest data word having the largest cumulative time interval is dropped from the data word buffer. Program control then proceeds back to decision block 402 to wait until additional data words have been received.

Referring back to decision block 408, if at least three words have been found to have stored time intervals which correlate with the time interval ranges in RAM 110, program control proceeds to block 414 where words having stored time intervals outside the expected time interval ranges are dropped from the data word buffer in RAM 110 in FIG. 1. Next, at decision block 416, if five correlated data words are left, program control proceeds to the decode subroutine of FIG. 5 for decoding the five data words. Otherwise, program control proceeds back to decision block 402 to wait until additional data words have been received. Depending on the degree of system reliability desired, decision block 416 may transfer program control to the decode subroutine of FIG. 5 when any desired number of data words greater than three have been found to be timewise correlated. In the preferred embodiment of the present invention, the data words are repeated eleven times in the data signal, such that it is highly probably that five timewise correlated data words may be reliably detected with a very low probability of falsing.

In summary, the correlation routine of FIG. 4 continues to search for timewise correlated data words, while eliminating those data words which are not correlated, until at least five of the possible eleven data words in a data signal have been found to be correlated. According to an important feature of the present invention, the five timewise correlated data words need not be consecutive, and could be any five of the possible eleven data words which are found to be correlated with any of the time interval ranges stored in RAM 110 of FIG. 1. For example, it may be determined by the correlation routine that the 2nd, 3rd, 6th, 9th and 11th data words are correlated with the time interval ranges in RAM 110 in FIG. 1.

Furthermore, the correlation routine of the present invention is not likely to be falsed on Barker sequences embedded within the data word, since the cumulative elapsed time interval resulting from such embedded Barker sequences will not correlate with the time interval ranges in RAM 110 which correlated with the cumulative elapsed time intervals of valid data words. Moreover, if the Barker word for a data word is missed entirely, the elapsed time interval counter continues to decrement resulting in a longer elapsed time interval, and longer elapsed time intervals have no effect other than causing data words having cumulative elapsed time intervals greater than 89 milliseconds to be discarded. Similarly, a false detection of a Barker word due to noise or voice signals will not interfere with a following data signal, since the invalid data word due to the false Barker word detection will most likely be discarded either as too old or as not being timewise correlated with succeeding data words from the data signal.

Figure 5:
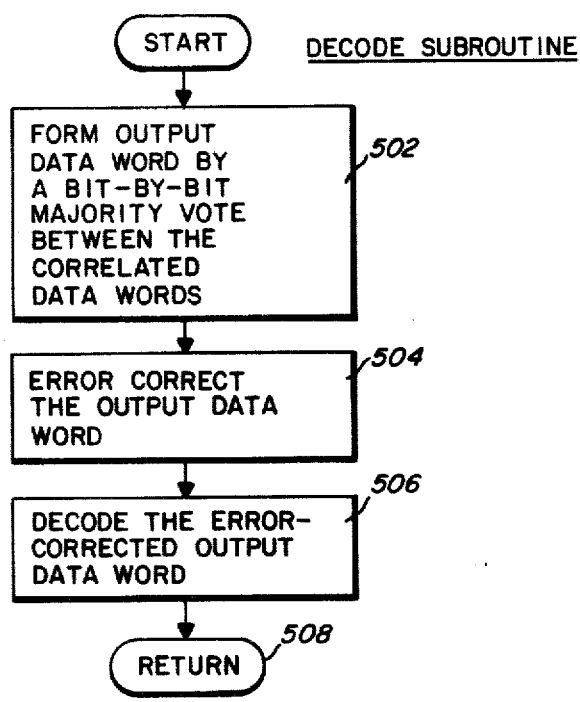
FIG. 5 is a flow chart of a decode subroutine that may be stored in the read-only memory in FIG. 1.
Figure 6:
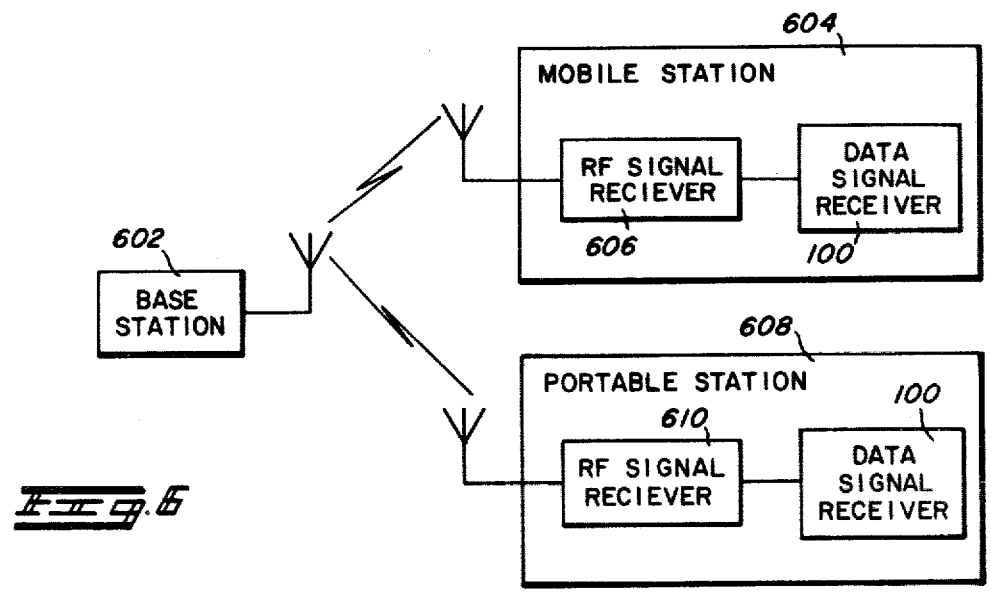
FIG. 6 is a block diagram of a radio communication system which may advantageously utilize the data signal receiver in FIG. 1.

Once five data words have been timewise correlated, program control may be transferred from the correlation routine of FIG. 4 to the decode subroutine of FIG. 5. The decode subroutine may include any suitable conventional techniques for validating the correlated data words. Referring to FIG. 5, at block 502, an output data word may be formed by taking a bit-by-bit majority vote between the five correlated data words. Thus the bits of at least three of the five correlated data words will determine the individual bits of the output data word. Next, at block 504, the output data word may be error corrected according to a conventional error correcting code, which has been pre-selected for encoding the data words. If the particular signalling format utilized does not include an error correcting code, error correcting of the output data word will be unnecessary. Finally, at block 506, the error-corrected output data word may be decoded according to conventional techniques to determine the appropriate action that is to be taken at the receiving station. For example, the decoded output data word may command a mobile or portable station to switch from one radio channel to another as the mobile or portable station passes from one cellular radio coverage area to another. Depending on the particular communication system utilizing the present invention, the output data word may be advantageously utilized for any desired supervisory functions.

Referring to Table I, there is provided a program listing for implementing the flow charts in FIGS. 3 and 4. A description of the operation of the instructions in the program listing is provided in Table II. The program listings in Table I are illustrative of the preferred embodiment of the present invention which utilizes the Motorola type M6800 microcomputer. Similar program listings for other conventional microcomputers can be readily coded by one skilled in the programming art, utilizing these program listings, the flow charts of FIGS. 3 and 4 and the description therefor provided hereinabove.

In summary, an improved method and apparatus for detecting a data signal including repeated data words has been described which is particularly well adapted for use on noisy channels of communication systems. The inventive data signal detecting method and apparatus may be advantageously utilized for detecting data signals transmitted on a voice channel to mobile and portable stations of a radio communication system. The data signal may include any number of repeated data words greater than three which are each preceded by a synchronization word. When the reception of at least three data words are timewise correlated with one another, the inventive method and apparatus of the present invention provide a correlation indication signal to indicate that valid data words have been received. Since the inventive data signal detecting method and apparatus are not dependent on detection of consecutive data words, correlation will not be impaired nor falsed by the false detection, or non-detection, of synchronization words.

TABLE 1

PROGRAM LISTING

| ADDR | | | INSTR | | COMMENTS |
|---|---|---|---|---|---|
| | | | *TIME POINTERS USED TO STORE THE TIME OF | | |
| | | | *EACH MEMBER | | |
| 00DE 0001 | A | T1 | RMB | 1 | TIME OF FIRST MEMBER R0 |
| 00DF 0001 | A | T2 | RMB | 1 | |
| 00E0 0001 | A | T3 | RMB | 1 | |
| 00E1 0001 | A | T4 | RMB | 1 | |
| 00E2 0001 | A | T5 | RMB | 1 | TIME OF LAST MEMBER R4 |
| | | | *BUFFER STORAGE | | |
| 00E3 0019 | A | BUF1 | RMB | 25 | ROTATING BUFFER FOR DATA |
| 0101 0002 | A | CPNTB | RMB | 2 | CURRENT BUFFER POINTER NUMBER OF ENTRIES IN BUFFER |
| 0104 0002 | A | JTEMP | RMB | 2 | TEMP FOR X IN FORINT |
| 0106 0001 | A | TIM1 | RMB | 1 | DELTA TIME INTERVAL COUNTER |
| 0107 0001 | A | POINT | RMB | 1 | POINTER FOR BUFFER |
| 0108 0001 | A | SHIFT | RMB | 1 | SHIFT POINTER |
| 0109 0001 | A | SHIFT1 | RMB | 1 | CURRENT SHIFT POINTER |
| 010A 0001 | A | DT | RMB | 1 | DELTA TIME INTERVAL |
| 0113 00 | A | TAB1 | FCB | 00,01,08,09,17,18,26,27 | |
| 011B 23 | A | | FCB | 35,36,44,45,52,53,61,62,70,71 | |
| 0125 4F | A | | FCB | 79,80,88,89,96,97 | |
| 012D 0001 | A | JPCNT1 | RMB | 1 | |
| | | | *CORRELATION ROUTINE | | |
| 40E2 7D 0074 | A | KSTART | TST | TCORR | CHECK TO SEE IF TCORR IS SET |
| 40E5 26 08 40EF | | | BNE | C00 | IF SET, CORE-LATE THE DATA |
| 40E7 7D 0007 | A | | TST | KFLAG | |
| 40EA 27 F6 40E2 | | | BEQ | KSTART | |
| 40EC 7E DEC | A | | JMP | DEC | JUMP TO THE DECODE ROUTINE |
| 40EF 5F | | C00 | CLRB | | CLR TAU |
| 40F0 86 05 | | C2 | LDAA | #5 | |
| 40F2 B7 012D | A | | STAA | JPCNT1 | SETUP 5 TIMES COUNTER |
| 40F5 7F 0108 | A | | CLR | SHIFT | CLEAR OUT SUM |
| 40F8 7F 0107 | A | | CLR | POINT | CLEAR OUT POINTER |
| 40FB CE 00DE | A | | LDX | #T1 | SETUP TIME POINTER |
| 40FE FF 0101 | A | | STX | CPNTB | |
| | | | *NOW SETUP THE TIME (X CONTAINS THE TIME | | |
| | | | *POINTER) | | |
| 4101 A6 00 | A | C3 | LDAA | 0,X | GET TIME INTERVAL |
| 4103 1B | | | ABA | | ADD TAU, WHERE TAU=0−7MS |
| 4104 CE 0113 | A | | LDX | #TAB1 | GET TABLE POINTER |
| | | | *NOW CHECK IF TIME IS IN WINDOW | | |
| 4107 A1 00 | A | C4 | CMPA | 0,X | CHECK IF LOWER BOUND |
| 4109 25 04 410F | | | BCS | C5 | |
| 410B A1 01 | A | | CMPA | 1,X | |
| 410D 23 09 411A | | | BLS | C8 | BRANCH IF CORRELATED |
| 410F 08 | | C5 | INX | | NOT CORRELATED |
| 4110 08 | | | INX | | |
| | | | *CHECK IF AT END OF TABLE | | |
| 4111 8C 012B | A | | CPX | #TAB1+24 | |
| 4114 26 F1 4107 | | | BNE | C4 | |
| 4116 0C | | C7 | CLC | | CLEAR OUT CARRY FOR POINTER |
| 4117 7E 411E | A | | JMP | C9 | |
| 411A 7C 0108 | A | C8 | INC | SHIFT | CORRELATION FOUND |
| 411D 0D | | | SEC | | |

TABLE 1-continued
PROGRAM LISTING

| ADDR | | | INSTR | | COMMENTS |
|---|---|---|---|---|---|
| 411E 76 0107 | A | C9 | ROR | POINT | SHIFT INTO POINTER |
| 4121 7A 012D | A | C10 | DEC | JPCNT1 | DEC LOOP COUNTER |
| 4124 27 0A 4130 | | | BEQ | C12 | |
| 4126 FE 0101 | A | C11 | LDX | CPNTB | RESET THE TABLE POINTER |
| 4129 08 | | | INX | | |
| 412A FF 0101 | A | | STX | CPNTB | |
| 412D 7E 4101 | A | | JMP | C3 | |
| 4130 B6 0108 | A | C12 | LDAA | SHIFT | CHEDK IF ENOUGH ELEMENTS |
| 4133 81 03 | A | | CMPA | #3 | |
| 4135 2C 32 4169 | | | BGE | C15 | |
| 4137 5C | | C13 | INCB | | INCREMENT TAU |
| 4138 C1 08 | A | | CMPB | #8 | |
| 413A 26 B4 40F0 | | | BNE | C2 | |
| | | *FIND OLDEST ELEMENT | | | |
| 413C C6 01 | A | C16 | LDAB | #01 | POINTER |
| 413E 4F | | | CLRA | | OLDEST VALUE |
| 413F CE 00DE | A | | LDX | #T1 | TIME POINTER |
| 4142 A1 00 | A | C161 | CMPA | 0,X | |
| 4144 22 08 414E | | | BHI | C162 | BRANCH IF A IS HIGHER |
| 4146 FF 0101 | A | | STX | CPNTB | |
| 4149 F7 0107 | A | | STAB | POINT | |
| 414C A6 00 | A | | LDAA | 0,X | |
| 414E 58 | | C162 | ASLB | | |
| 414F 08 | | | INX | | |
| 4150 8C 00E3 | A | | CPX | #T1+5 | |
| 4153 26 ED 4142 | | | BNE | C161 | |
| | | *POINT NOW CONTAINS A ONE IN OLDEST | | | |
| | | *LOCATION | | | |
| 4155 86 1F | A | | LDAA | #S1F | |
| 4157 B8 0107 | A | | EORA | POINT | INVERT OLDEST MEMBER |
| 415A B7 0107 | A | | STAA | POINT | |
| | | *NOW FIND EMPTY ELEMENT AND SETUP POINTERS | | | |
| 415D F6 0107 | A | C20 | LDAB | POINT | |
| 4160 BD 4523 | A | | JSR | FBUFE | FIND NEW POINTERS |
| 4163 01 0101 | A | | NOP | | |
| 4166 73 40E2 | A | | JMP | KSTART | RETURN TO KSTART |
| | | *SETUP PROPER POINTER | | | |
| 4169 74 0107 | A | C15 | LSR | POINT | |
| 416C 74 0107 | A | | LSR | POINT | |
| 416F 74 0107 | A | | LSR | POINT | |
| 4172 81 05 | A | C17 | CMPA | #05 | A CONTAINS # OF CORRELATIONS |
| 4174 01 0101 | A | | NOP | | |
| 4177 27 03 DEC | | | BEQ | DEC | JUMP TO THE DECODE SUBROUTINE |
| 4179 7E 415D | A | | JMP | C20 | SET UP POINTERS AND GET MORE POINTS |
| | | *END OF CORRELATION ROUTINE | | | |
| | | *INTERRUPT SUBROUTINE | | | |
| 4459 B6 9003 | | | LDAA | BCONTR | IMS. INT./ |
| 445C 48 | | | ASLA | | SHIFT BIT TO CARRY |
| 445D 24 0D 446C | | | BCC | FORINT | =0?, MUST BE DATA |
| 445F F6 0106 | | | LDAB | TIM1 | =0, 1 MS TIMER |
| 4462 27 04 4468 | | | BEQ | TMF | TIM1=0? IF YES, LEAVE ALONE |
| 4464 5A | | | DECB | | TIM1=0, THEN DECREMENT |
| 4465 B7 0106 | | | STAB | TIM1 | REPLACE WITH NEW VALUE |
| 4468 F6 9002 | TMF | | LDAB | BDATA | RESET INTERRUPT |
| 446B 38 | | | RTI | | RETURN FROM INTERRUPT |
| 446C B6 9000 | A | FORINT | LDAA | ADATA | READ IN DATA AND RESET INTERRUPT |
| | | *STORE BYTE AWAY CPNTB+JPCNT1 | | | |
| 446F F6 012D | A | | LDAB | JPCNT1 | FORM ADDITION |
| 4472 FB 0102 | A | | ADDB | CPNTB+1 | ADD CPNTB |

TABLE 1-continued
PROGRAM LISTING

| ADDR | | | INSTR | COMMENTS | |
|---|---|---|---|---|---|
| 4475 F7 0105 | A | | STAB | JTEMP+1 | ADD JPCNT1 |
| 4478 F6 0101 | A | | LDAB | CPNTB | |
| 447B C9 00 | A | | ADCB | #00 | |
| 447D F7 0104 | A | | STAB | JTEMP | |
| 4480 FE 0104 | A | | LDX | JTEMP | LOAD POINTER |
| 4483 A7 00 | A | | STAA | 0,X | STORE DATA |
| | | *CHECK IF FIRST BYTE OF DATA | | | |
| 4485 B6 012D | A | | LDAA | JPCNT1 | |
| 4488 26 12 449C | | | BNE | FOR2 | BRANCH IF NOT FIRST BYTE OF DATA |
| | | *FIRST BYTE OF DATA UPDATE DELTA TIME | | | |
| | | *INTERVAL | | | |
| 448A C6 59 | A | FOR1 | LDAB | #89 | ORIGINAL TIME = 89 MS |
| 448C F0 0106 | A | | SUBB | TIM1 | SUBTRACT TIME FOR 89 MS |
| 448F F7 010A | A | | STAB | DT | STORE DELTA TIME |
| 4492 C6 59 | A | | LDAB | #89 | |
| 4494 F7 0106 | A | | STAB | TIM1 | RESET 1 MS TIMER |
| | | *SETUP SHIFT POINTER | | | |
| 4497 C6 01 | A | | LDAB | #01 | |
| 4499 F7 0108 | A | | STAB | SHIFT | |
| | | *NOW ADD TIME TO OTHER TIMES | | | |
| | | *CHECK IF CURRENT ACTIVE BUFFER | | | |
| | | *A CONTAINS JPCNT1 | | | |
| 449C F6 0108 | A | FOR2 | LDAB | SHIFT | FORM SHIFT POINT |
| 449F F5 0107 | A | | BITB | POINT | BIT=1 IF ACTIVE BUFFER |
| 44A2 27 2E 22D2 | | | BEQ | FOR4 | BRANCH IF INACTIVE BUFFER |
| | | *FORM TIME BUFFER ADDRESS | | | |
| 44A4 BB 44C0 | A | | ADDA | LBL+1 | |
| 44A7 B7 0105 | A | | STAA | JTEMP+1 | |
| 44AA B6 44BF | A | | LDAA | LBL | |
| 44AD 89 00 | A | | ADCA | #00 | PROPAGATE CARRY |
| 44AF B7 0104 | A | | STAA | JTEMP | |
| 44B2 FE 0104 | A | | LDX | JTEMP | LOAD IN POINTER |
| | | *CHECK IF CURRENT LOAD | | | |
| 44B5 F5 0109 | A | | BITB | SHIFT1 | SHIFT SHIFT1 |
| 44B8 27 07 44C1 | | | BEQ | FOR9 | |
| 44BA 6F 00 | A | | CLR | 0,X | |
| 44BC 73 44D2 | A | | JMP | FOR4 | |
| 44BF 00DE | A | LBL | FDB | T1 | |
| | | *NOW ADD DELTA TIME INTERVAL | | | |
| 44C1 A6 00 | | FOR9 | LDAA | U,X | LOAD TIME INTERVAL |
| 44C3 BB 010A | A | | ADDA | DT | ADD DT |
| 44C6 A7 00 | A | | STAA | 0,X | |
| 44C8 81 59 | A | | CMPA | #89 | CHECK IF LESS THAN 89 MS |
| 44CA 23 06 44D2 | | | BLS | FOR4 | BRANCH IF RECENT |
| | | *ELIMINATE FOR BUFFER (B CONTAINS SHIFT) | | | |
| 44CC F8 0107 | A | FOR3 | EORB | POINT | ZERO OUT OLD REGISTER |
| 44CF F7 0107 | A | | STAB | POINT | RESTORE POINTER |
| | | *UPDATE POINTERS | | | |
| 44D2 78 0108 | A | FOR4 | ASL | SHIFT | SHIFT OVER TIMER POINTER |
| 44D5 B6 012D | A | | LDAA | JPCNT1 | |
| 44D8 4C | | | INCA | | |
| 44D9 B7 012D | A | | STAA | JPCNT1 | |
| 44DC 81 05 | A | | CMPA | #05 | CHECK IF LAST BYTE |
| 44DE 26 0A 44EA | | | BNE | FOR8 | RETURN IF NOT LAST BYTE |
| | | *LAST BYTE CHECK IF BUFFER FULL | | | |
| 44E0 F6 0107 | A | FOR5 | LDAB | POINT | |
| 44E3 C1 1F | A | | CMPA | #$1F | |
| 44E5 27 06 44ED | | | BEQ | FOR6 | BRANCH IF FULL |
| | | *UPDATE NEW POINTERS | | | |
| 44E7 BD 4523 | A | | JSR | FBUFE | |
| 44EA 7E 44F0 | A | FOR8 | JMP | RTNI | |
| 44ED 7C 0074 | A | FOR6 | INC | TCORR | SET CORRECTION FLAG |
| 45F0 3B | | RTNI | RTI | | RETURN FROM |

TABLE 1-continued
PROGRAM LISTING

| ADDR | | INSTR | | COMMENTS |
|---|---|---|---|---|
| | | | | INTERRUPT |
| *END OF INTERRUPT SUBROUTINE | | | | |
| | | *FBUFE SUBROUTINE | | |
| 4523 7F 021D | A | FBUFE | CLR JPCNT1 | CLEAR OFFSET |
| 4526 17 | | | TBA | TRANSFER POINT TO A |
| 4527 85 01 | A | | BITA #01 | CHECK IF 1ST BUFFER FREE |
| 4529 27 14 453F | | | BEQ FOR10 | |
| 452B 85 02 | A | | BITA #02 | CHECK IF 2ND BUFFER FREE |
| 452D 27 18 4547 | | | BEQ FOR11 | |
| 452F 85 04 | A | | BITA #04 | CHECK IF 3RD BUFFER FREE |
| 4531 27 1C 454F | | | BEQ FOR12 | |
| 4533 85 08 | A | | BITA #08 | CHECK IF 4TH BUFFER FREE |
| 4535 27 20 4557 | | | BEQ FOR13 | |
| 4537 CE 00F7 | A | | LDX #BUFI+20 | 5TH MUST BE FREE |
| 453A 86 10 | A | | LDAA #$10 | |
| 453C 7E 455C | A | | JMP FOR14 | |
| 453F CE 00E3 | A | FOR10 | LDX #BUFI | |
| 4542 86 01 | A | | LDAA #$01 | |
| 4544 7E 455C | A | | JMP FOR14 | |
| 4547 CE 00E8 | A | FOR11 | LDX #BUFI+5 | |
| 454A 86 02 | A | | LDAA #$02 | |
| 454C 7E 455C | A | | JMP FOR14 | |
| 454F CE 00ED | A | FOR12 | LDX #BUFI+10 | |
| 4552 86 04 | A | | LDAA #$04 | |
| 4554 7E 455C | A | | JMP FOR14 | |
| 4557 CE 00F2 | A | FOR13 | LDX #BUFI+15 | |

TABLE II
PROGRAM LISTING DESCRIPTION

| ADDRESS BLOCK | DESCRIPTION |
|---|---|
| | CORRELATION ROUTINE |
| 40E2–40EE | If TCORR=1, jump to address 40EF to correlate the five received data words. |
| 40EF–4100 | LOAD JPCNT1 with a five and clear out the B accumulator and registers, SHIFT and POINT. Load address 00DE into CPNTB. This contains the first window value to which the time buffer will be compared. |
| 4101–4103 | Load the time window and add it to the B register, which contains TAU. The first time through this will result in the addition of zero, since TAU varies from 0–7 ms. The second time through TAU is one, the third time TAU is two, etc. |
| 4104–4106 | Load the table pointer which accesses the time interval in the time buffer associated with the data buffer. |
| 4107–410E | Is the time interval within the time interval range? If so, jump to C8 (4101). |
| 410F–4115 | If the time interval is not within the time interval range, get the next range and repeat until all ranges have been checked. |
| 4116–4119 | If all time interval ranges have been checked and no correlation has been detected, clear the carry and then go to address, 411E. |
| 411A–411D | If a match has been found, set the carry bit. |
| 411E–4120 | Rotate to the right the contents of register, POINT. This rolls in the carry or lack of carry, thereby indicating which buffers were correlated. |
| 4121–4125 | Reduce the counter, JPCNT1, by one and check if all five buffers have been checked. |
| 4126–412F | If all five buffers have not been checked, set up a new data buffer and a base address in CPNTB and return to C3 (4101). |
| 4130–4136 | If all five buffers have been checked, and if 3 or more buffers are correlated, jump to C15 (4169). |
| 4137–4139 | If 3 or more buffers are not correlated, increment accumulator B and check if B=8. |
| 413A–413B | If B does not equal 8, return to C2 (40F0). This occurs because the buffers are full, and no correlation has been found. Note that correlation windows are 8 msec apart. Therefore, shift the stored time intervals by one millisecond and try again. When B is equal to eight, every possible shifted stored time interval has been checked with all time interval ranges and no correlation between 3 or more buffers exists. |
| 413C–4154 | If Accumulator B is 8, the oldest data word held in buffer is eliminated. |
| 4155–415C | Set up data register, POINT, to point to the oldest data word. This then is the pointer for the next data word to be received. |
| 415D–4168 | Jump to subroutine FBUFE, which sets up the pointers for the next data word to be received. Then return from subroutine. |
| 4169–4179 | Set up the pointer and branch to the decode routine for decoding and verifying the correlated data words. |
| | INTERRUPT ROUTINE |
| 4459–446B | Check to see if the interrupt has been |

TABLE II-continued
PROGRAM LISTING DESCRIPTION

| ADDRESS BLOCK | |
|---|---|
| | caused by the 1 ms clock or by the synchronization unit. If interrupted in response to the 1 ms clock, decrement TIM1 and return. Otherwise, jump to address 446C to receive a byte of a data word. |
| 446C-446E | Accumulator A is loaded by a byte of a data word received from the synchronization unit. |
| 446F-4479 | Load the offset pointer, JPCNTI, with the free buffer base line pointer, CPNTB, and store it JTEMP. I.e., CPNTB points to a particular location where a word is to be stored and JPCNTI points to a particular byte of that word. |
| 4480-4484 | Store the byte received from synchronization unit into the proper location. |
| 4485-4489 | Check to see if this was the first byte of a data word. If so, JPCNTI is set to zero. |
| 448A-4496 | If this is the first byte of the data word, the time interval since reception of the last word is determined. Note: The timer (TIM1) decrements with each 1 msec clock interrupt starting at 89 ms. and ending at zero. Therefore, accumulator B is loaded with 89 and then TIM1 is subtracted from it to result in the elapsed time interval from the last received word. The resulting contents of accumulator B are then stored in register DT. Next, 89 is loaded into TIM1 once again, and TIM1 is allowed to count down until the beginning of the next word. |
| 4497-449B | Since this is the first byte of a data word, store a "one" in the register, SHIFT. |
| 449C-44B4 | Check if the current buffer is active. If it is active, form the address of the time register for this buffer and load the formed address into the X register. Note: Each data buffer has a time buffer associated with it. The time buffer is used to determine how old each data word is. |
| 44B5-44D1 | Check if this is the current load. If it is the current load, set it to zero. If it has been previously loaded, add DT time (just computed at 448A-4496) to the time buffer. Now, check if time buffer is greater than 89. If it is, the data is eliminated by dropping the active status bit contained in register, POINT. |
| 44D2-44DF | Set up the next buffer address. If this is not the last byte, return from interrupt and wait for the next Barker word detect. |
| 44E0-44F0 | If this is the fifth data word, set variable, TCORR, to one so that the program will know that a correlation is to be performed. Then return from the interrupt routine. If five words have not been received, just return from the interrupt routine. |

We claim:

1. A method for receiving a data signal, including at least three data words each preceded by a synchronization word, transmitted on a communication channel to a remote station, wherein said remote station includes memory means, means for receiving the data signal, means for detecting the synchronization word before each data word thereof, and means for providing a synchronization indication signal upon detection of each synchronization word, said method comprising the steps of:

(a) storing a received data word in the memory means in response to the synchronization indication signal;

(b) measuring the time interval between a previously received data word and the presently received data word, and storing said measured time interval in the memory means with the presently received data word;

(c) incrementing each previously stored time interval by said measured time interval and storing said incremented time interval in the memory means in place of said previously stored time interval;

(d) deleting a stored data word and corresponding stored time interval from the memory means if said corresponding stored time interval has a magnitude greater than a predetermined magnitude; and (e) correlating the stored time intervals with predetermined time interval ranges and providing a correlation indication signal if at least three stored time intervals occur within said predetermined time interval ranges.

2. The method according to claim 1, wherein said data signal includes at least eleven consecutive data words each preceded by a synchronization word, and wherein said correlating step provides a correlation indication signal if at least five stored time intervals occur within the predetermined time interval ranges.

3. The method according to claim 1 or 2, wherein said data signal is preceded by a bit synchronization signal, and wherein step (a) further includes the step of synchronizing to the bit synchronization signal.

4. The method according to claim 1, wherein said correlating step is performed only after three data words have been received and stored.

5. The method according to claim 2, wherein said correlating step is performed only after five data words have been received and stored.

6. The method according to claim 1, further including the step of:

(f) forming in response to the correlation indication signal an output data word having bits which are selected on the basis of a bit by bit majority vote taken over the corresponding bits of stored data words which correspond to the correlated time intervals.

7. The method according to claim 1 or 2, wherein said correlating step further includes the step of deleting from the memory means the largest stored time interval and its corresponding data word if at least three stored time intervals do no occur within predetermined time interval ranges.

8. The method according to claim 1, 2, 4, 5, or 6, wherein said remote station is a mobile station of a radio communication system.

9. Apparatus for receiving a data signal, including at least three data words each preceded by a synchronization word, transmitted on a communication channel to a remote station, wherein said remote station includes memory means, means for receiving the data signal, means for detecting the synchronization word before each data word thereof, and means for providing a synchronization indication signal upon detection of each synchronization word, said apparatus comprising:

(a) means for storing a received data word in the memory means in response to the synchronization indication signal;

(b) means for measuring the time interval between a previously received data word and the presently received data word, and storing said measured time interval in the memory means with the presently received data word;

(c) means for incrementing each previously stored time interval by said measured time interval and storing said incremented time interval in the memory means in place of said previously stored time interval;

(d) means for deleting a stored data word and corresponding stored time interval from the memory means if said corresponding stored time interval has a magnitude greater than a predetermined magnitude; and (e) means for correlating the stored time interval with predetermined time interval ranges and providing a correlation indication signal if at least three stored time intervals occur within said predetermined time interval ranges.

10. The apparatus according to claim 9, wherein said data signal includes at least eleven consecutive data words each preceded by a synchronization word, and wherein said correlating means provides a correlation indication signal if at least five stored time intervals occur within the predetermined time interval ranges.

11. The apparatus according to claim 9 or 10, wherein said data signal is preceded by a bit synchronization signal, and wherein said data word storing means further includes means for synchronizing to the bit synchronization signal.

12. The apparatus according to claim 9, wherein said correlating means is enabled to correlate only after three data words have been received and stored.

13. The apparatus according to claim 10, wherein said correlating means is enabled to correlate only after five data words have been received and stored.

14. The apparatus according to claim 9, further including:

(f) means responsive to the correlation indication signal for forming an output data word having bits which are selected on the basis of a bit by bit majority vote taken over the corresponding bits of stored data words which correspond to the correlated time intervals.

15. The apparatus according to claim 9 or 10, wherein said correlating means further includes means for deleting from the memory means the largest stored time interval and its corresponding data word if at least three stored time intervals do not occur within the predetermined time interval ranges.

16. The apparatus according to claim 9, 10, 12, 13 or 14, wherein said remote station is a mobile station of a radio communication system.

17. The apparatus according to claim 16, wherein said remote station is a portable station of the radio communication system.

18. A method for receiving a data signal, including at least three data words each preceded by a synchronization word, transmitted on a communication channel to a remote station, wherein said remote station includes memory means, means for receiving the data signal, means for detecting the synchronization word before each data word thereof, and means for providing a synchronization indication signal upon detection of each synchronization word, said method comprising the steps of:

(a) storing a received data word in the memory means in response to the synchronization indication signal;

(b) measuring the time interval between a previously received data word and the presently received data word, and storing said measured time interval in the memory means with the presently received data word;

(c) incrementing each previously stored time interval by said measured time interval and storing said incremented time interval in the memory means in place of said previously stored time interval; and (d) correlating the stored time intervals with predetermined time interval ranges and providing a correlation indication signal if at least three stored time intervals occur within said predetermined time interval ranges.

* * * * *